Figure 1:
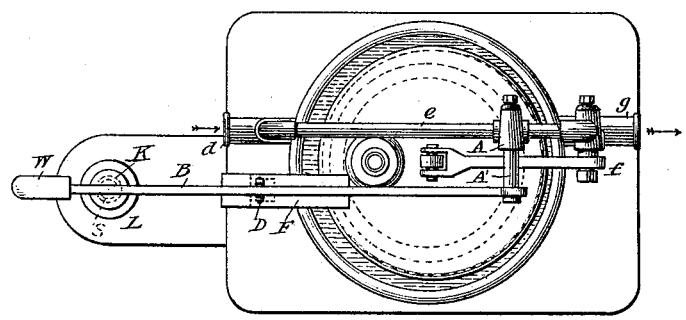

(No Model.) 2 Sheets—Sheet 1.

G. YOUNG.
AUTOMATIC CUT-OFF FOR GAS PRESSURE REGULATORS.

No. 366,708. Patented July 19, 1887.

(No Model.) 2 Sheets—Sheet 2.
G. YOUNG.
AUTOMATIC CUT-OFF FOR GAS PRESSURE REGULATORS.
No. 366,708. Patented July 19, 1887.
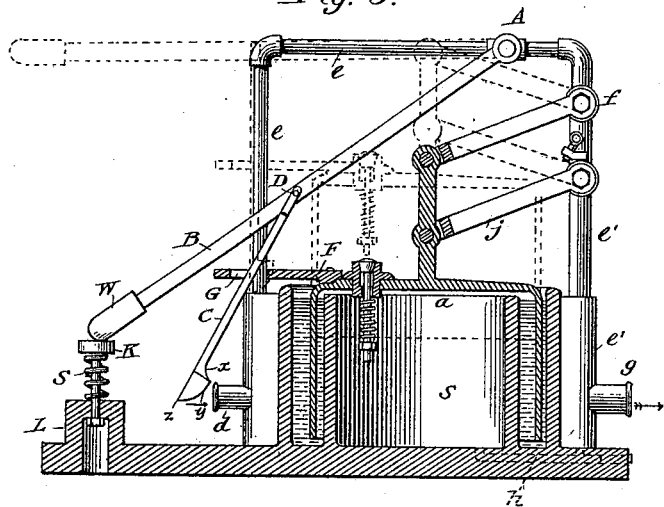
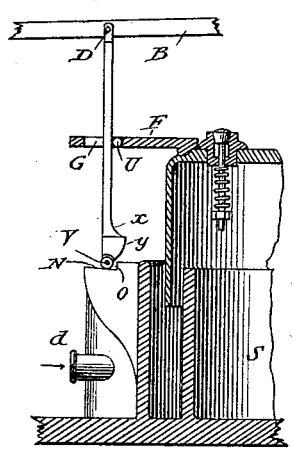
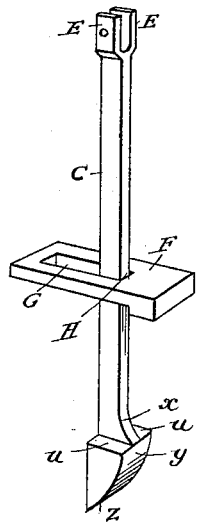
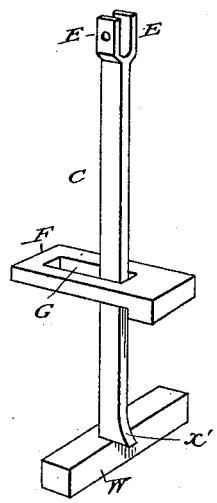

United States Patent Office.

GILBERT YOUNG, OF WORTHINGTON, PENNSYLVANIA, ASSIGNOR TO CABOT BROTHERS, OF SAME PLACE.

AUTOMATIC CUT-OFF FOR GAS-PRESSURE REGULATORS.

SPECIFICATION forming part of Letters Patent No. 366,708, dated July 19, 1887.

Application filed May 5, 1887. Serial No. 237,194. (No model.)

*To all whom it may concern:*

Be it known that I, GILBERT YOUNG, a citizen of the United States, residing at Worthington, in the county of Armstrong and State of Pennsylvania, have invented certain new and useful Improvements in Automatic Cut-Offs for Gas-Pressure Regulators; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

When gas is procured from natural wells it is often found to be under such high and variable pressure that its immediate consumption is either inconvenient or dangerous, or both. It has therefore been found necessary to employ devices interposed between the source of gas and the point of consumption for reducing the gas pressure continuously and automatically to the desired degree. These devices, known as "gas-pressure regulators," ordinarily operate to cause the gas, when under pressure which is higher than the standard required in the distributing system, to partially close the outlet-valve to the distributing system, and when the pressure sinks below this standard to open the said valve wider. It thus happens that when the supply of gas fails entirely the oulet-valve is wide open, and the burners at which the gas is consumed should then be closed in order that the gas, when it commences to flow again, may not escape into the locality where it is used, whereby explosions and consequent loss of property and life may be caused. It is, however, clear that gas-burners cannot always be watched, and as a rule they remain open when the gas-supply fails, and numerous calamities occur from this cause.

Now, it is the object of my invention to provide a means for obviating this defect of gas-pressure regulators; and my invention consists, broadly, in automatic mechanism which may be applied to any ordinary gas-pressure regulator that works by the rise and fall of a float, cap, or cover, and whenever the gas-pressure falls below a certain predetermined point, or when the supply of gas, from whatever cause, fails entirely, this mechanism operates to shut off the supply.

It will be understood that my improvement is not limited for use in connection with systems fed from natural wells, but may be used with the same advantage whatever be the source of gas.

In the annexed drawings, which form a part of this specification, my invention is illustrated as applied to the gas-pressure regulator patented to S. Cabot, Jr., April 14, 1885, No. 315,717; but it may be used in connection with any other apparatus of the same kind.

Figure 2:
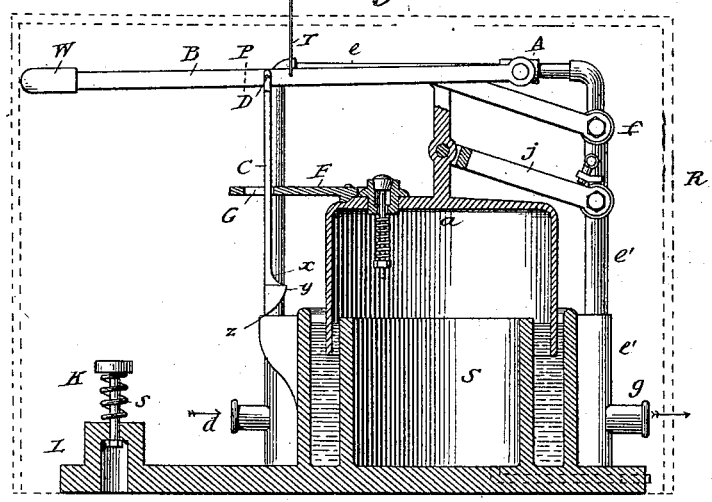

Figure 1 represents a plan view of a gas-pressure regulator with my improved cut-off applied thereto; Figs. 2 and 3, sectional elevations of the same; Fig. 4, a sectional elevation of a modification; Fig. 5, a perspective view of a detail of construction, and Fig. 6 a like view of a modification thereof.

The general mode of operation of the gas-pressure regulator is fully described in the aforesaid Letters Patent No. 315,717, and need not here be described at length. It is sufficient to know that the gas enters the apparatus at $d$ and passes by the pipes $e$ $e'$ and by the outlet $g$ to the distributing system. The channel $h$ communicates with the pipe $e'$ and with the inclosed chamber $s$, which in turn is in free communication with the bell $a$, which rises and falls in the fluid seal $b$. An increase of pressure within the suitably-weighted bell raises the latter and causes the same to partially close the regulating-valve $f$, while under a decrease of pressure the bell sinks and the opening of valve $f$ is widened. When the supply of gas fails entirely the bell descends to its lowest point, and valve $f$ is quite open, and upon re-establishment of the flow of gas the same escapes at the open burners in the distributing system.

I provide a cut-off valve, A, located at any suitable point in pipe $e$ or $e'$. The spindle A' of said valve projects horizontally, and to its outer end is fixed a long arm or lever, B, provided with a suitable weight, W. The latter may be omitted if the arm itself is sufficiently heavy. The arrangement is such that when the cut-off valve is open lever B is in its raised position, as shown in Fig. 2; but when lever B is in its lower position, as indicated in Fig. 3, the cut-off valve will be closed.

C designates a prop or support for lever B. It consists of a rod loosely pivoted to lever B, so as to be able to swing like a pendulum about its horizontal axis D, which passes through the two branches E E of its forked end and through the lever B. The free end of prop C is widened and thickened. It is cam-shaped in two directions, as is clearly shown in the drawings. One cam is cut upon a concave curve, $x$, which proceeds from the side of the prop some little distance above its end, and widens out toward and terminates at a short distance above the end. At this point the cam becomes thicker and protruding on both sides abruptly and is convex down to the end, as shown at $y$, and it terminates in a dull knife-edge, $z$, all of which is clearly shown in Fig. 5.

From the top of bell $a$ projects a bracket, F, horizontally, and a slot, G, in said bracket receives loosely the prop C, so that when the bell rises or falls the bracket will move along the main body of the prop without perceptible friction. When the lever B is raised, the prop will swing pendulously into a vertical position, with its knife-edge just above the top and close to the edge of the apparatus or any other fixed part of the same. The lever being then gently allowed to descend, the knife-edge of the prop, coming against the top of the case, will arrest the further descent of the lever, which is thus supported in an elevated position, whereby the cut-off valve A is held open. If, now, by a decrease of gas-pressure the bell descends, the bracket will move downward with the same without perceptible frictional contact with the body of the prop; but as the descent of the bell continues the inner end, H, of the slot, facing the edge of the prop, will engage the concave cam-face $x$, and will gently force the knife-edge $z$ toward and over the edge of the apparatus. By this time the gas-pressure will be so low that the cut-off valve A should be closed, and this result follows immediately as soon as the knife-edge has passed the edge of the case. The weighted lever B is now without support, and must fall into the position indicated in Fig. 3, and, being secured to the spindle or core of valve or cock A, it will turn the same around, so as to close said valve or cock.

The utility of the convex cam-face $y$ will now be apparent. Its function is to deflect the prop from the case as soon as the knife-edge has passed the same, serving as an inclined plane, which, while it does not prevent the descent of lever B, renders the same somewhat less violent. Arriving near its lowest position, the end of lever B encounters a boss, K, which is held up by a spring, S, and is mounted in a suitable casting, L, or in any other suitable support, the object being to prevent the straining of the cut-off cock by the check of the falling weight. The gas is now shut off from the distributing system, and when the supply through pipe $e$ is re-established the cut-off valve should be opened; but before this is done the burners in the distributing system are turned off, or they may have been turned off right after the automatic closure of the cut-off valve. In either case no gas can escape, and dangers heretofore experienced from this cause are avoided. To again open the cut off valve, it is only necessary to raise lever B to its upper position, as above explained. In doing this, the bell being then in its lowest position, cam $x$ of prop C will engage the end of slot G, whereby the prop will be deflected, with its knife-edge beyond the edge of the case of the apparatus. In this operation the ledges $u\,u$ of cam $y$ will limit the upward movement of the lever by coming in contact with the lower face of bracket F, through the slot G of which cam $y$ cannot pass. In this position valve A is open, and knife-edge $z$ of cam $y$ is above and beyond the edge of the case, the bell being in its lowest position. The lever is held in this position until the influx of gas sufficiently raises the bell to carry the bracket F above cam $x$, when prop C will swing pendulously into vertical position with the knife-edge overhanging the edge of the case. The lever is then lowered until its downward movement is arrested by the knife-edge coming in contact with the top of the case. If it is desired to inclose the whole apparatus, including lever B, in a cover, R, as indicated by dotted lines in Fig. 2, the resetting of the cut off may be accomplished by a cord or wire, T, which passes through the top of the cover to the place from whence it is to be operated.

In Fig. 4 I have shown a modification, which in some cases is of special advantage. In this form there is a small anti-friction roller, U, journaled in slot G, which roller thus constitutes the end of the slot. A similar roller, V, is provided at the lower end of cam $y$ and takes the place of the knife-edge. With this arrangement it becomes necessary to provide a special place upon the top of the case for the roller V to rest upon. In the drawings I have shown a platform, N, cut into the top of the case and slightly inclining inwardly. It terminates at a shoulder, O, which arrests the inward movement of the prop. By this arrangement the action of the cut-off is somewhat facilitated.

In some instances it is objectionable to have the lever B project beyond the case of the apparatus, and in such cases I cut the lever off at a point, P, (indicated by dotted lines in Fig. 2,) close to the point where the prop is pivoted to the same. The weight W is then secured to the lower end of the prop, as shown in Fig. 6, said weight serving also as a stop for the upward movement of the prop in the same manner as the ledges $u\,u$ in the construction shown in Fig. 5. The convex cam-face $y$ is here omitted, and the foot of the prop projects beyond the weight to rest upon the upper surface and close to the edge of the casing. For the concave cam-face a simple inclined plane, $x'$, may be substituted. If this construction is employed, the spring-supported boss K is arranged in position to receive the blow of the weight, as will be easily understood. In connection with this form of prop the anti-friction rollers U and V may also be used—the one U being inserted into slot G and the other, V, being placed under the projecting portion of the foot of the prop.

Having now fully described my invention, I wish it to be understood that I do not limit myself to the exact details of construction shown, since the same may be widely varied without departing from the fundamental idea of the same. Thus, for instance, it is not necessary that the gas-regulator should be of the type described in this case, as my improvement may be equally well applied to gas-regulators which do not work by the rise and fall of an inverted vessel or bell, but by the oscillatory movement of any other structural element. The term "bell," which I use in this specification, is here used in the most generic sense, indicating that part of a gas-pressure regulator which rises and falls or which oscillates during the regulating operation of the apparatus.

What I claim, and desire to secure by Letters Patent, is—

1. A gas-pressure regulator operating by the rise and fall of a bell, provided with a cut-off valve, a suspended weight for actuating said valve, and a projection from the bell for releasing said weight, substantially as described.

2. In a gas-pressure regulator operating by the rise and fall of a bell, the combination, with a cut-off valve and a suspended weighted lever for actuating the same, of a projection from the bell for releasing the lever, substantially as described.

3. In a gas-pressure regulator operating by the rise and fall of a bell, the combination, with a cut-off valve and a weighted lever for actuating the same, of a prop for holding the lever in an elevated position and a projection from the bell for removing the prop and allowing the lever to actuate the valve, substantially as described.

4. In a gas-pressure regulator operating by the rise and fall of a bell, the combination, with a cut-off valve, a weighted lever for actuating said valve, and a prop for holding said lever out of action, of a cam upon said prop projecting into the path of a bracket upon the descending bell, whereby the lever is released and the valve closed when the bell arrives at its lowest point, substantially as described.

5. In a gas-pressure regulator operating by the rise and fall of a bell, the combination, with a cut-off valve, a weighted lever for actuating the same, a pendulous prop pivoted to the lever, and a cam near the lower end of the prop, of a slotted bracket projecting from the bell for engagement with the cam, whereby the lever is released and the valve closed when the bell arrives near its lowest point, substantially as described.

6. In a gas-pressure regulator operating by the rise and fall of a bell, the combination, with a cut-off valve, a weighted lever for actuating the valve, and a pendulous prop for holding the lever out of action, of a bracket projecting from the bell, having a slot for receiving the prop, and a cam projecting from the lower part of the prop into the path of the bracket, substantially as described.

In testimony whereof I affix my signature in presence of two witnesses.

GILBERT YOUNG.

Witnesses:
MAY SMITH,
J. D. DAUGHERTY.